US010877542B2

(12) United States Patent
Jin

(10) Patent No.: US 10,877,542 B2
(45) Date of Patent: Dec. 29, 2020

(54) POWER MANAGEMENT SYSTEM AND METHOD IMPLEMENTING INTERCONNECT CONTROLS

(71) Applicant: ALIBABA GROUP HOLDING LIMITED, George Town (KY)

(72) Inventor: Lingling Jin, San Mateo, CA (US)

(73) Assignee: ALIBABA GROUP HOLDING LIMITED, George Town (KY)

( * ) Notice: Subject to any disclaimer, the term of this patent is extended or adjusted under 35 U.S.C. 154(b) by 109 days.

(21) Appl. No.: 16/295,992

(22) Filed: Mar. 7, 2019

(65) Prior Publication Data
US 2020/0285467 A1  Sep. 10, 2020

(51) Int. Cl.
*G06F 1/32* (2019.01)
*G06N 3/08* (2006.01)
*G06F 1/3206* (2019.01)
*G06F 1/3234* (2019.01)

(52) U.S. Cl.
CPC ......... *G06F 1/3206* (2013.01); *G06F 1/3253* (2013.01); *G06N 3/08* (2013.01)

(58) Field of Classification Search
CPC ........ G06F 1/3206; G06F 1/3253; G06N 3/08
See application file for complete search history.

(56) References Cited

U.S. PATENT DOCUMENTS

| 10,001,827 | B2 * | 6/2018 | Woo .................... G06F 11/3041 |
| 10,444,813 | B2 * | 10/2019 | Subramanian .......... G06F 1/266 |
| 10,671,147 | B2 * | 6/2020 | Rotem .................. G06F 1/3206 |
| 2019/0102311 | A1 * | 4/2019 | Gupta ................. G06F 12/0884 |

* cited by examiner

*Primary Examiner* — Stefan Stoynov
(74) *Attorney, Agent, or Firm* — Finnegan, Henderson, Farabow, Garrett & Dunner, LLP

(57) ABSTRACT

The present disclosure provides a system and a method for power management of accelerators using interconnect configuration. The method comprises receiving a power management command comprising a power budget and a designated accelerator, identifying a port associated with the designated accelerator from a plurality of ports of an interconnect, determining a target data transmission parameter for the designated accelerator according to the power budget, and controlling a data transmission parameter relative to the target data transmission parameter through the port associated with the designated accelerator. The present disclosure further provides a non-transitory computer-readable medium that stores a set of instructions that are executable by one or more processors of an apparatus to perform the method for power management of accelerators using interconnect configuration.

28 Claims, 6 Drawing Sheets

POWER MANAGEMENT SYSTEM AND METHOD IMPLEMENTING INTERCONNECT CONTROLS

BACKGROUND

Computer systems use dedicated accelerators in place of processors for many modern applications, including applications based on artificial intelligence (AI). While some of the accelerators can provide a speedup of up to 1000 for AI applications, the accelerators can be very expensive pricewise, and the execution of AI applications can be power consuming. Although these accelerators provide basic power management capabilities, they rely heavily on driver programs to manage and control power limits. In computing environments that do not have access to driver programs, such as a cloud environment, power management of accelerators is very difficult to achieve.

SUMMARY

Embodiments of the present disclosure provide a method for power management of accelerators using interconnect configuration. The method comprises receiving a power management command comprising a power budget and a designated accelerator, identifying a port associated with the designated accelerator from a plurality of ports of an interconnect, determining a target data transmission parameter for the designated accelerator according to the power budget, and controlling a data transmission parameter relative to the target data transmission parameter through the port associated with the designated accelerator.

Embodiments of the present disclosure further provide a computer system to perform power management of accelerators using interconnect configuration. The system comprises an interconnect, one or more accelerators, and a processor configured to receive a power management command comprising a power budget and a designated accelerator from one or more accelerators, identify a port associated with the designated accelerator from a plurality of ports of an interconnect, determine a target data transmission parameter for the designated accelerator according to the power budget, and control a data transmission parameter relative to the target data transmission parameter through the port associated with the designated accelerator.

Embodiments of the present disclosure further provide a non-transitory computer readable medium that stores a set of instructions that are executable by one or more processors of an apparatus to perform a method. The method comprises receiving a power management command comprising a power budget and a designated accelerator, identifying a port associated with the designated accelerator from a plurality of ports of an interconnect, determining a target data transmission parameter for the designated accelerator according to the power budget, and controlling a data transmission parameter relative to the target data transmission parameter through the port associated with the designated accelerator.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Along with the rapid development and deployment of modern computer applications such as AI applications, computing capacity and computing speed play indispensable roles. As a result, a computer system executing modern computer applications generally uses dedicated accelerators (e.g., neural network processing units (NPUs), graphics processing units (GPUs), tensor processing units (TPUs), Field Programmable Gate Arrays (FPGAs)) to perform computations and spare system's main processor (e.g., central processing units (CPUs)) for other essential computations. GPUs are some of the most commonly used accelerators for AI applications, particularly in the training phase of deep learning models. Due to the complex and taxing nature of AI computations, accelerators are often driven to their maximum computation capacity in order to meet AI computation's efficiency requirement. For example, a modern 8-GPU server can consume more than 3000 watts of thermal design power (TDP) while executing an AI application. Without appropriate power control, accelerators can overload and operate at a capacity beyond their recommended system power, resulting in disruptive or even hazardous operations. Some of the accelerators provide options to adjust power consumptions, but such options are available only through the accelerator's driver program. In computing environments that do not have access to accelerators' driver programs, such as a cloud environment, power management of accelerators is very difficult to achieve.

Figure 1:
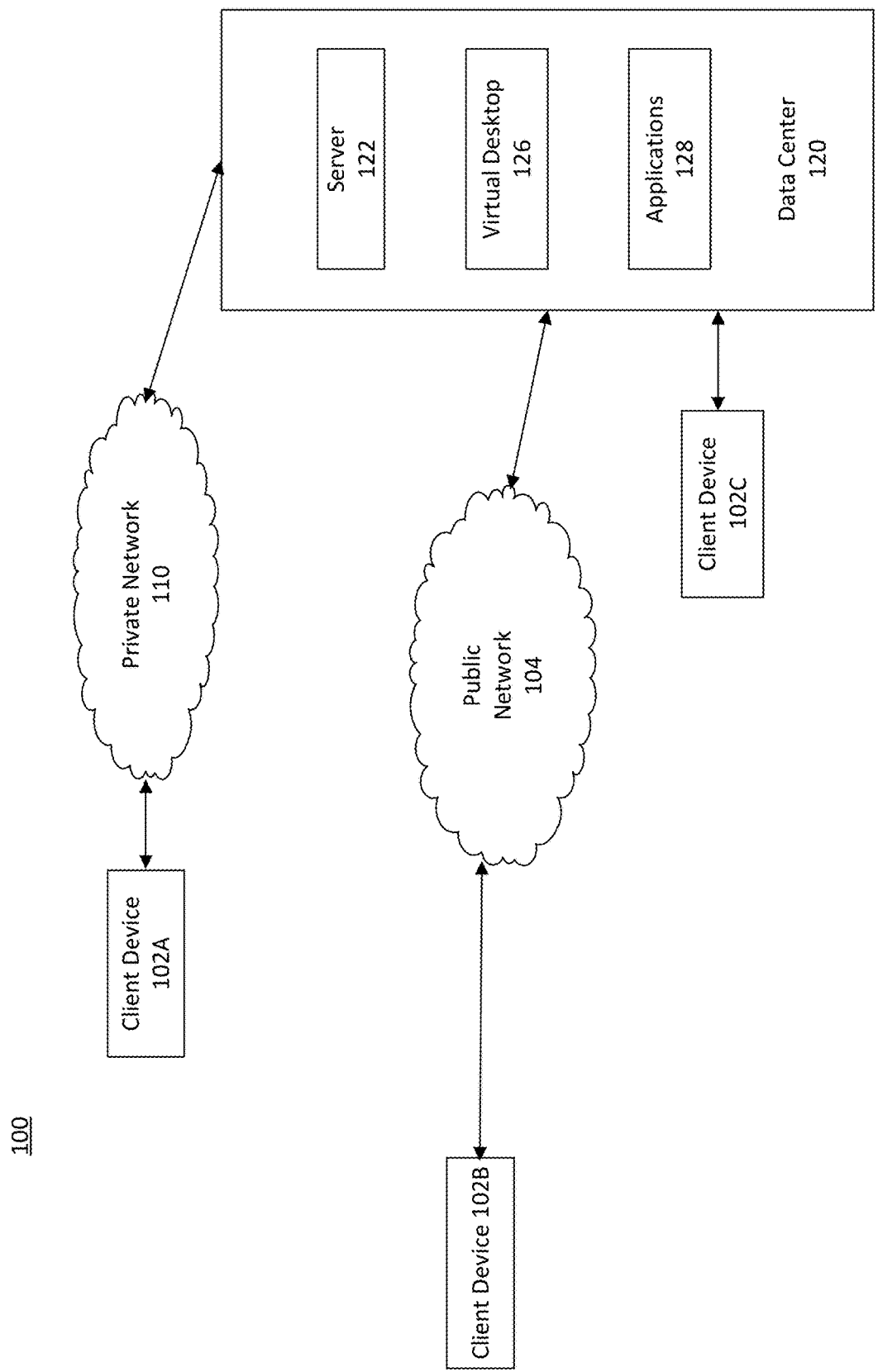
FIG. 1 is a schematic diagram of an exemplary computing environment for implementing embodiments and features of the present disclosure.

FIG. 1 is a schematic diagram of an exemplary computing environment for implementing embodiments and features of the present disclosure. As shown in FIG. 1, computing environment 100 can include any combination of one or more client devices 102A, 102B or 102C, public network(s) 104, private network(s) 110, and data center(s) 120. In some embodiments, computing environment 100 can be a cloud environment. In some embodiments, client device 102A-C can be implemented with hardware devices and software applications running thereon. A user can use client device 102A-C to communicate with one or more other client devices 102A-C and data center(s) 120 over public network(s) 104 or private network(s) 110. Computing environment 100 can include any number of client devices, or any combination of types of client devices. In some embodiments, client devices 102 can perform AI applications for users.

Computing environment 100 can also include one or more public networks 104 or private networks 110. Public network(s) 104 or private network(s) 100 can connect and provide for the exchange of information among client device(s) 102A-C, among data center(s) 120, or between client device(s) 102A-C and data center(s) 120.

Computing environment 100 can further include one or more data center(s) 120. Data center 120 can be a central repository, either physical or virtual, for the storage, management, or dissemination of data or information pertaining to a particular public or private entity. Data center 120 can include one or more physical servers, virtual servers, storage systems, web servers, databases, mainframe computers, general-purpose computers, personal computers, or other types of computing devices. Data center 120 can include, among other things, one or more servers (e.g., server(s) 122), virtual desktops (e.g., virtual desktop(s) 126) and applications (e.g., application(s) 128).

Figure 2:
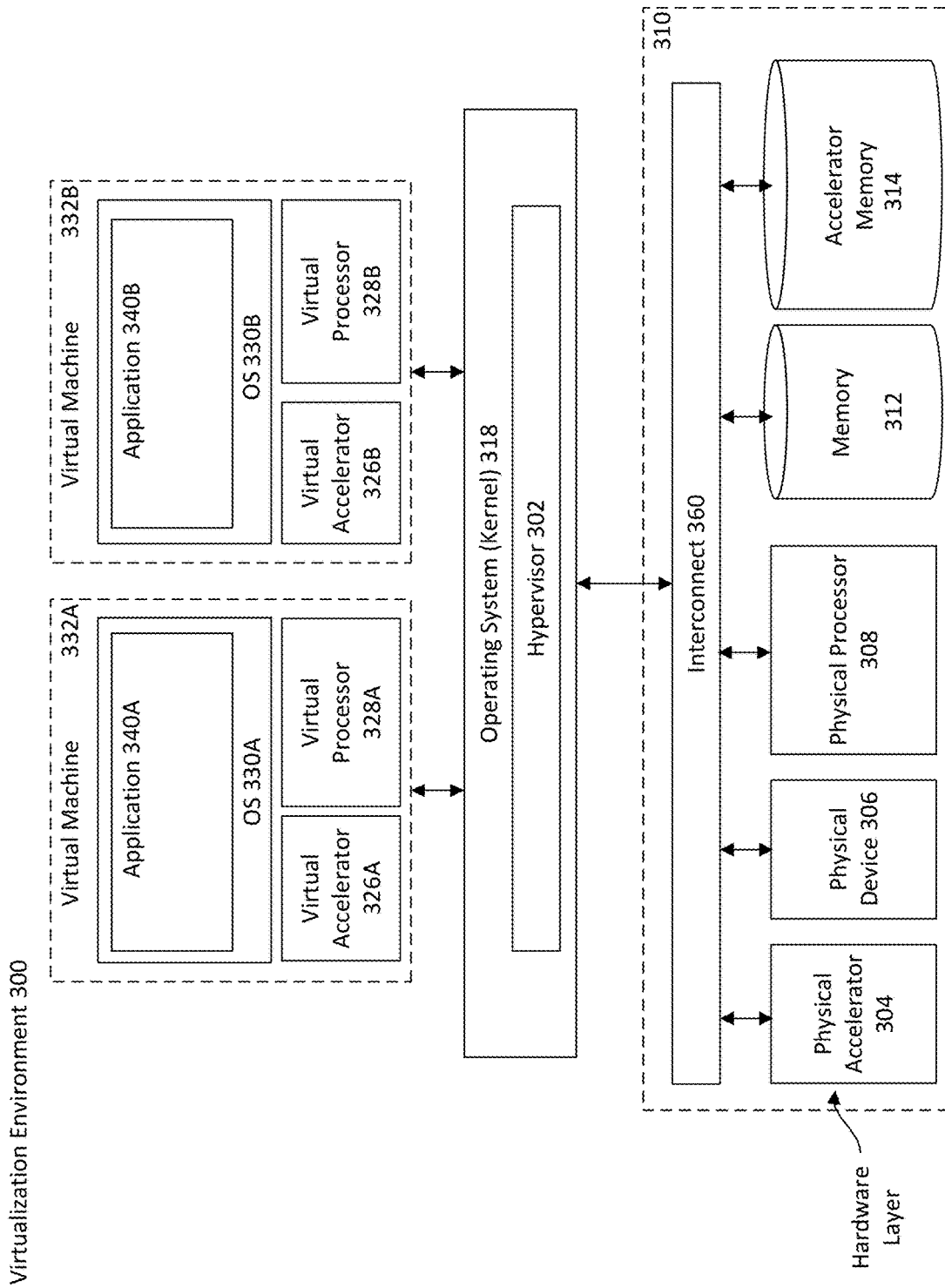
FIG. 2 is a schematic diagram illustrating an exemplary virtualization environment 300 for implementing embodiments and features of the present disclosure.

Computing environment 100 can be supported by a virtualization environment. FIG. 2 is a schematic diagram illustrating an exemplary virtualization environment 300 for implementing embodiments and features of the present disclosure. In some embodiments, virtualization environment 300 can be implemented on a server (e.g., server 122 of FIG. 1) or a client device (e.g., client devices 102 of FIG. 1). The modules, programs, virtual machines, or commands stored or executed by virtualization environment 300 can be executed by a data center, such as data center 120 of FIG. 1.

Virtualization environment 300 can include a hardware layer 310 that can include one or more interconnects 360 and one or more physical resources. Physical resources can include one or more physical accelerators 304, one or more physical devices 306, one or more physical processors 308, one or more memories 312, and one or more accelerator memories 314. Each physical resource is connected to interconnect 360 on a port of interconnect 360 (e.g., a slot). In some embodiments, operating system 318 or physical processor 308 keeps a mapping between the ports of interconnect 360 and physical resources, including physical accelerators 304. In some embodiments, physical accelerator 304 can be a GPU, an NPU, a TPU, or any other processing unit that accelerates computation for a computer application. In some embodiments, physical processor 308 can be a CPU.

Virtualization environment 300 can include one or more memories 312. Memory 312 can include any type of memory that can store data, programs, firmware, or executable instructions. Programs, firmware, or executable instructions stored in one or more memories 312 can be executed by one or more physical processors 308 of virtualization environment 300. One or more accelerator memories 314 can include any memory accessible by one or more physical accelerators 304.

Virtualization environment 300 can further include an operating system 318 that can be stored in one or more memories 312 and executed by one or more physical processors 308. Operating system 318 can also be referred to as a kernel. Moreover, virtualization environment 300 can include a hypervisor 302. Hypervisor 302 can be a program executed by physical processor(s) 308 in virtualization environment 300 to manage any number of virtual machines, such as virtual machines 332A and 332B. In some embodiments, operating system 318 can be a Linux kernel, and hypervisor 302 can be a kernel-based virtual machine (KVM).

Operating system 318 and hypervisor 302 can control and manage data flow from and to physical resources in hardware layer 310 through interconnect 360. Each physical resource in hardware layer 310 is connected to interconnect 360 and each physical resource can transmit and receive data to and from each other through their connections to interconnect 360. Data transmission between each physical resource can be managed by operating system 318 or hypervisor 302 by configuring interconnect 360. For example, operating system 318 and hypervisor 302 can configure interconnect 360 to limit data transmission parameter (e.g., data transmission rate, bandwidth, etc.) between physical processor 308 and physical accelerator 304. In some embodiments, interconnect 360 can be a peripheral component interconnect express (PCIe) bus or a mesh network (e.g., NVLink).

Virtual machine 332A-B can be a software-based emulation of a physical machine. Virtual machine 332A-B can further include a software-based emulation of the execution of software programs on such a physical machine. In some embodiments, virtual machine 332A-B can have a virtual operating system (e.g., virtual operating system 330A-B). Virtual operating system 330A-B can run applications (e.g., application 340A-B). Virtual machine 332A-B can have a virtual accelerator (e.g., virtual accelerator 326A-B) and a virtual processor (e.g., virtual processor 328A-B). Virtual machine 332A-B can have access to the hardware resources in hardware layer 310 through hypervisor 302. For example, through hypervisor 302, virtual machine 332A-B can have access to one or more physical accelerators 304, one or more physical devices 306, one or more physical processors 308, one or more memories 312, and one or more accelerator memories 314. In some embodiments, virtual machine 332A-B can be accessed by a client device, such as client device 102A-C of FIG. 1.

Figure 3:
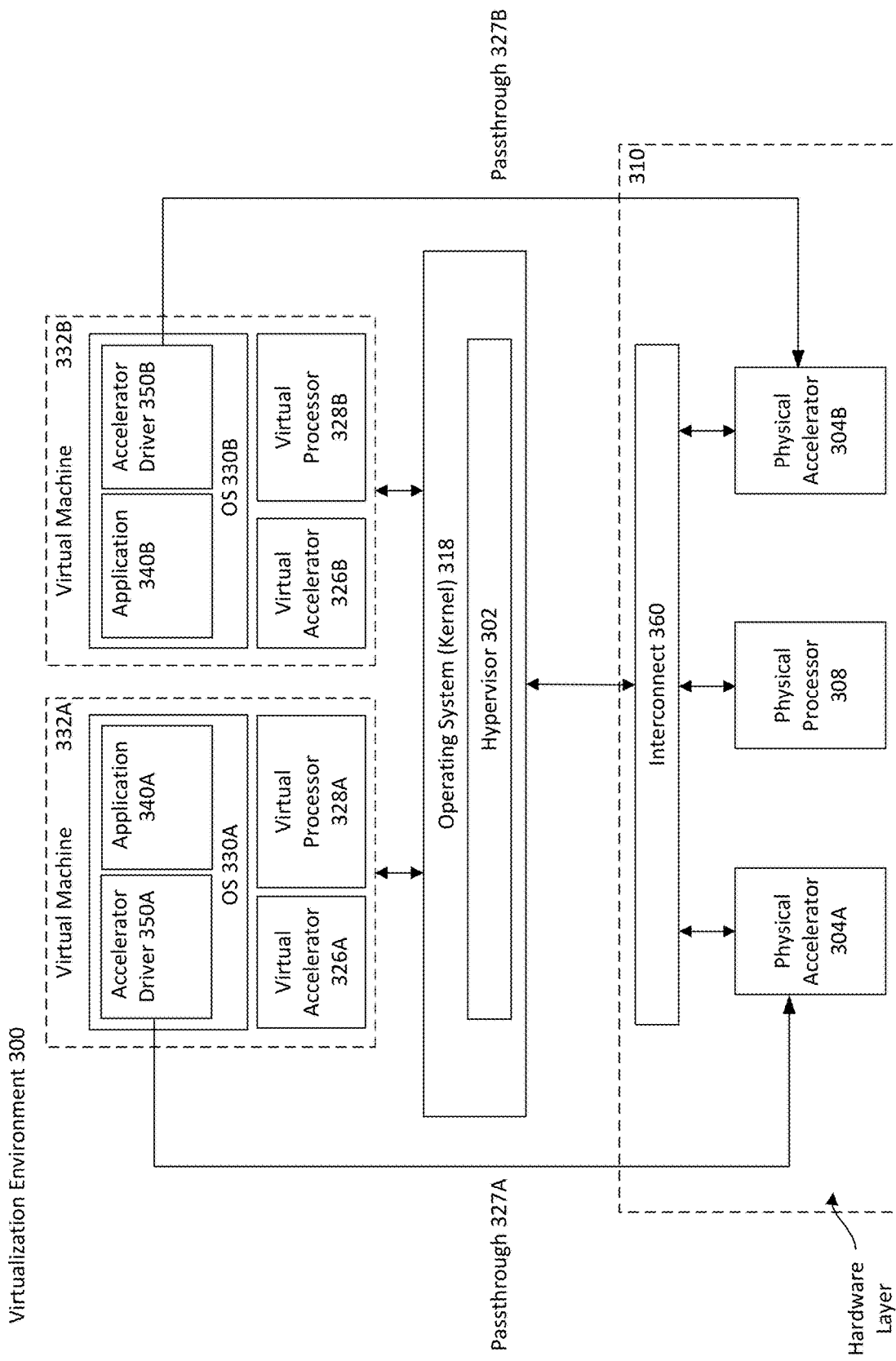
FIG. 3 is a schematic diagram illustrating exemplary virtualization environment having passthroughs for implementing embodiments and features of the present disclosure.

Virtual machine 332A-B can manage power consumption of physical accelerators and obtain power consumption information of physical accelerators through physical accelerators' driver programs and passthroughs. FIG. 3 is a schematic diagram illustrating an exemplary virtualization environment having passthroughs for implementing embodiments and features of the present disclosure. On the basis of FIG. 2, virtual machines 332A and 332B of FIG. 3 have accelerator driver programs 350A and 350B installed. Accelerator driver programs 350A and 350B have passthrough functionalities 327A and 327B. Passthrough functionalities 327A and 327B allow virtual machines 332A and 332B to manage power consumption and performance of physical accelerators 304A and 304B. For example, as shown in FIG. 3, virtual machine 332A can manage physical accelerator 304A using passthrough 327A of accelerator driver program 350A, and virtual machine 332B can manage physical accelerator 304B using passthrough 327B of accelerator driver program 350B. With passthroughs 327A and 327B, virtual machines 332A and 332B can control the amount of power consumed by physical accelerators 304A and 304B, cap the power consumption of physical accelerators 304A and 304B, and monitor the power consumption of physical accelerators 304A and 304B.

Although virtual machines 332A and 332B can perform power management on physical accelerator 304A and 304B through driver programs and passthrough functionalities, operating system 318 does not have accelerator driver programs installed, and therefore operating system 318 does not have access to power management for physical accelerators. As shown in FIG. 3, operating system 318 cannot perform power management on physical accelerators 304A and 304B, since operating system 318 does not have accelerator driver programs (e.g., accelerator driver program 350A-B) installed. As a result, operating system 318 does not have access to information regarding the power consumption of physical accelerators 304A and 304B. Operating system 318, however, can obtain information on the total power consumption of the data center, which comprises all hardware resources.

Figure 4:
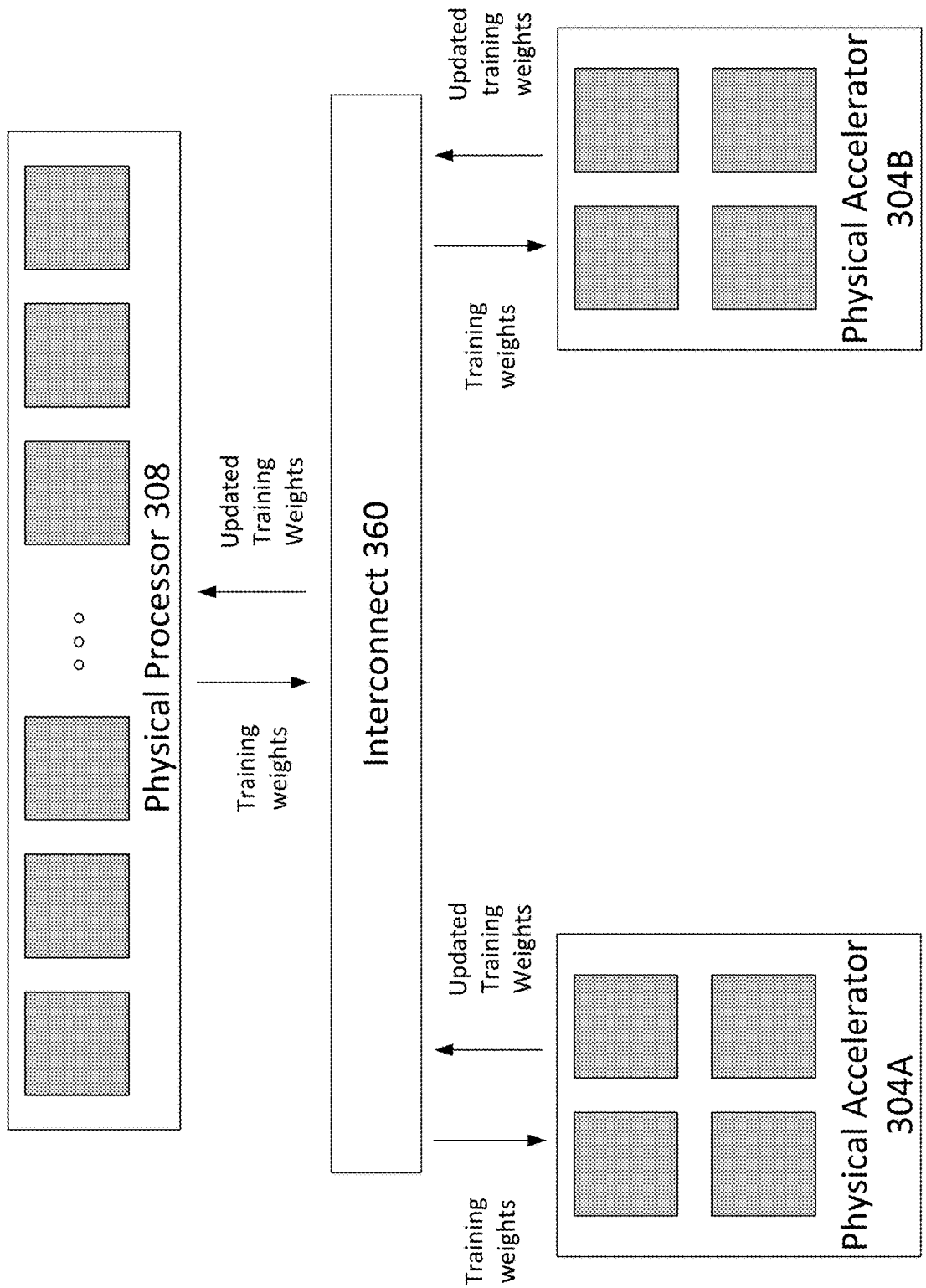
FIG. 4 is a schematic diagram of an exemplary system communication between physical processors and physical accelerators, according to some embodiments of the present disclosure.

Embodiments of the present disclosure provide methods and systems for power management on physical accelerators without having access to physical accelerators' driver programs. FIG. 4 is a schematic diagram of an exemplary system communication between physical processors and physical accelerators, according to some embodiments of the present disclosure. On the basis of FIG. 3, physical processor 308 of FIG. 4 is connected to physical accelerators 304A and 304B through interconnect 360.

In some embodiments, physical processor 308 runs many tasks for one or more AI applications. As shown on FIG. 4, physical processor 308 acts as a parameter server which contains all training weights in an algorithm of an artificial neural network. Each training weight is processed and updated through an AI operation task, which is represented in FIG. 4 by a box colored in grey. These AI operation tasks are assigned to physical accelerators, including physical accelerators 304A and 304B. Physical processor 308 sends training weights to physical accelerators 304A and 304B through interconnect 360, and physical accelerators 304A and 304B perform AI operation tasks on the received training weights. After physical accelerators 304A and 304B complete AI operation tasks, physical accelerators 304A and 304B send updated training weights back to physical processor 308 through interconnect 360.

As shown in FIG. 2, operating system 318 or hypervisor 302 can control and manage data transmission from and to physical resources in hardware layer 310 by configuring interconnect 360. In addition, operating system 318 or hypervisor 302 can manage data transmission between each physical resource by configuring interconnect 360. As shown in FIG. 4, when operating system 318 configures interconnect 360 to change the data transmission to and from physical accelerators 304A-B on the interconnect to a lower data transmission parameter, physical processor 308 sends training weights of the artificial neural network to physical accelerators 304A and 304B at a slower speed due to the reduced data transmission parameter. Since physical accelerators 304A and 304B receive the training weights at a slower speed, physical accelerators 304A and 304B operate at a slower speed, resulting in a reduction of power consumption. Therefore, operating system 318 can control the power consumption of physical accelerators 304A and 304B by configuring the data transmission parameter (e.g., data transmission rate, bandwidth, etc.) to and from physical accelerators 304A and 304B on interconnect 360. Operating system 318 does not need to have accelerator driver programs installed to control the power consumption of physical accelerators 304A and 304B.

Although AI applications are used as examples to demonstrate the exemplary system communication between physical processors and physical accelerators, the system according to FIG. 4 is not limited to running AI applications. Physical processor 308 of FIG. 4 can perform any type of application and transmit data from the application to physical accelerators 304A and 304B through interconnect 360. Operating system 318 can control the power consumption of physical accelerators 304A and 304B by configuring the data transmission parameter (e.g., data transmission rate, bandwidth, etc.) to and from physical accelerators 304A and 304B on interconnect 360, regardless of what type of applications physical processor 308 is performing.

Figure 5:
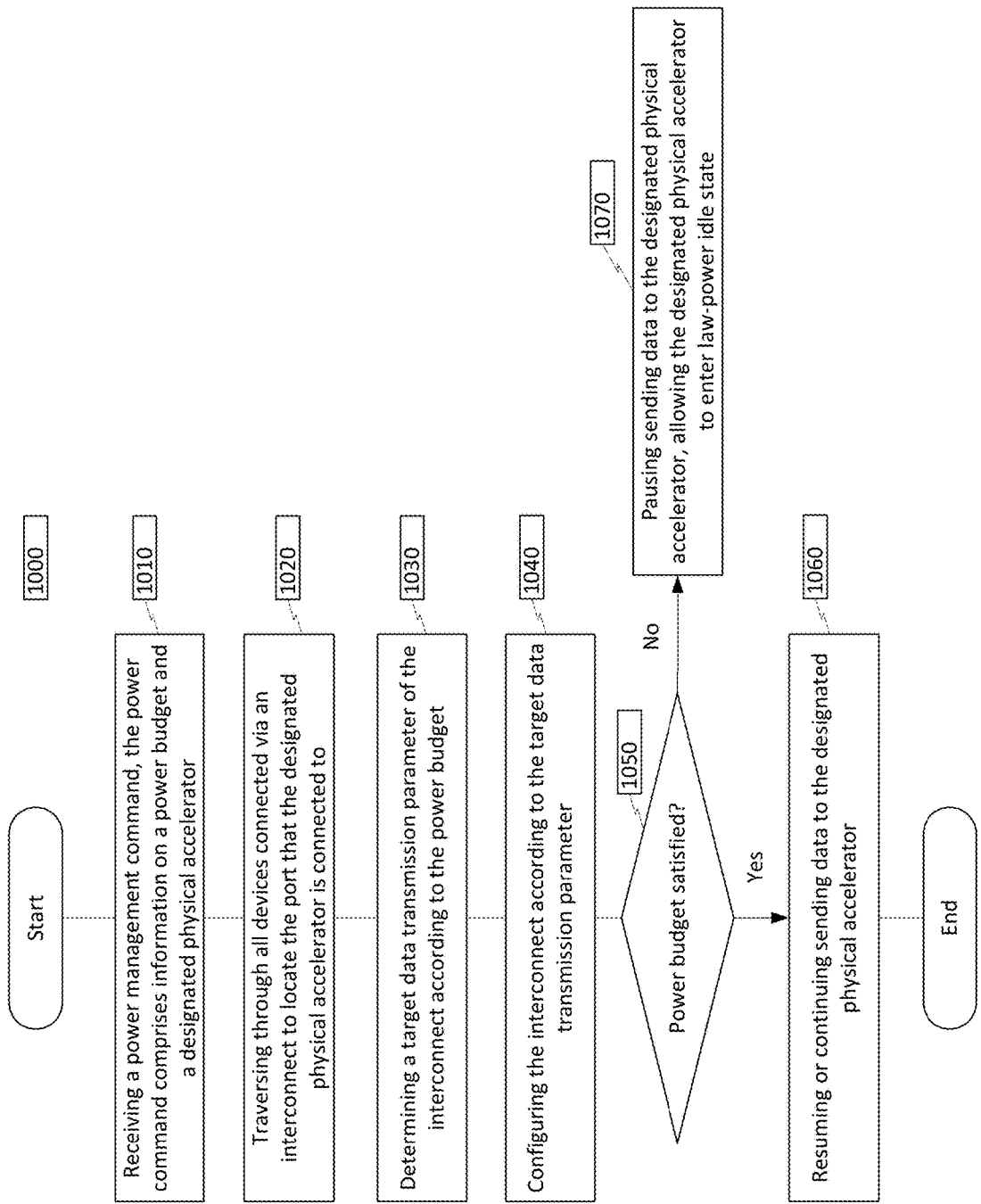
FIG. 5 is a flow diagram of an exemplary method for implementing power management of a physical accelerator through interconnect configuration, according to some embodiments of the present disclosure.

Embodiments of the present disclosure provide a method for power management of physical accelerators without having access to accelerator driver programs. FIG. 5 is a flow diagram of an exemplary method for implementing power management of a physical accelerator through interconnect configuration, according to some embodiments of the present disclosure. It is appreciated that method 1000 of FIG. 5 can be performed by an operating system in a virtualization environment (e.g., operating system 318 in virtualization environment 300 of FIG. 2 and FIG. 3).

In step 1010, the operating system receives a power management command. The power management command comprises a power budget and a designated physical accelerator. In some embodiments, the power budget is a predefined value for a data center (e.g., data center 120 of FIG. 1) or one or more servers that host the operating system. For example, as shown in FIG. 3, operating system 318 receives a power management command comprising a power budget and a designated physical accelerator. In some embodiments, the power management command is associated with the data center or one or more servers that host operating system 318, and the designated physical accelerator is physical accelerator 304A. In some embodiments, the power budget can be set by a user of the operating system, or operating system itself. For example, as shown in FIG. 3, a user of operating system 318, or operating system 318 itself, can set the power budget. In some embodiments, a power budget of the data center or the one or more servers is evaluated and used to determine a power budget for the designated physical accelerator. In such embodiments, the power management command can provide the power budget for the designated physical accelerator.

In step 1020, the operating system traverses through all ports (e.g., slots) on the interconnect and locates the port that the designated physical accelerator is connected to. For example, as shown in FIG. 3, operating system 318 traverses all ports on interconnect 360 and finds the port that physical accelerator 304A is connected to.

In step 1030, the operating system determines a target data transmission parameter (e.g., data transmission rate, bandwidth, etc.) of the interconnect according to the power budget. In some embodiments, interconnect has bandwidth options of 32 GB/s, 16 GB/s, 8 GB/s, 4 GB/s, etc. For the received power budget, the operating system may determine a target bandwidth that matches any of the bandwidth options. In some embodiments, the power budget can be used to determine a power budget associated with the accelerator and a corresponding bandwidth associated with the accelerator's power budget. For example, as shown in FIG. 3, interconnect 360 was operating at a bandwidth of 32 GB/s on the port that physical accelerator 304A is connected to. After receiving the power budget, operating system 318 determines a new bandwidth of 8 GB/s for the same port according to the power budget.

In step 1040, the operating system configures the interconnect to operate at the target data transmission parameter on the port. For example, as shown in FIG. 3, operating system 318 configures interconnect 360 to perform at a bandwidth of 8 GB/s for the port that physical accelerator 304A is connected to.

In step 1050, the operating system determines whether the power budget is satisfied. In some embodiments, the operating system determines the total power consumption of the data center and decides whether the total power consumption satisfies the power budget. If the power budget is satisfied, the operating system moves on to step 1060. If the power budget is still not satisfied, the operating system moves on to step 1070. For example, as shown in FIG. 3, after interconnect 360 has been configured, operating system 318 evaluates the total power consumption of the data center that hosts operating system 318 and decides whether the power consumption has satisfied the power budget.

In step 1060, having determined that the power budget is satisfied, the operating system continues or resumes sending data to the designated physical accelerator to keep the designated physical accelerator operating. For example, as shown in FIG. 3, having determined that the power budget is satisfied, operating system 318 continues to send data to physical accelerator 304A through interconnect 360, and physical accelerator 304A continues to operate.

In step 1070, having determined that the power budget is not satisfied, the operating system pauses sending data to the designated physical accelerator, allowing the designated physical accelerator to enter a low-power idle state. For example, as shown in FIG. 3, having determined that the power budget is not satisfied, operating system 318 pauses sending data to physical accelerator 304A, and physical accelerator 304A enter a low-power idle state.

Although method 1000 is conducted by the operating system in the embodiments, it is appreciated that a processor can conduct method 1000 by following instructions from the operating system. For example, as shown in FIG. 3, physical processor 308 can perform method 1000 by following instructions from operating system 318.

Method 1000 allows the operating system to perform power management on physical accelerators without accessing the physical accelerators' driver programs. According to method 1000, the operating system can adjust the target data transmission parameter of the interconnect, which is the amount of data transmission that goes in and out of the physical accelerators. The physical accelerators start to operate when it receives processing data in incoming data traffic from the interconnect, and output results through outgoing data traffic to the interconnect. For example, as shown in FIG. 4, physical processor 308 is running an AI application. Physical accelerators 304A and 304B start to operate when they receive training weights from physical processor 308 through interconnect 360. When the target data transmission parameter of the port connected to the designated physical accelerator is lowered, the designated physical accelerator receives data at a lower speed, which results in an increase of their idle time. As physical accelerators become idle more often, they consume less power, resulting in an overall reduction of power consumption for the data center. For example, as shown in FIG. 4, operating system 318 configures interconnect 360 to reduce the target data transmission parameter of the port connected to designated physical accelerator 304A. Accordingly, physical accelerator 304A receives training weights at a lower speed, resulting in an increase of physical accelerator 304A's idle time. When the operating system determines that the power budget is not satisfied even with a new target data transmission parameter implemented, the operating system can pause sending data traffic to the physical accelerators, allowing the physical accelerators to enter low-power idle state completely to further reduce their power consumption. Method 1000 does not need to use any power management options available in the physical accelerators' driver programs.

Figure 6:
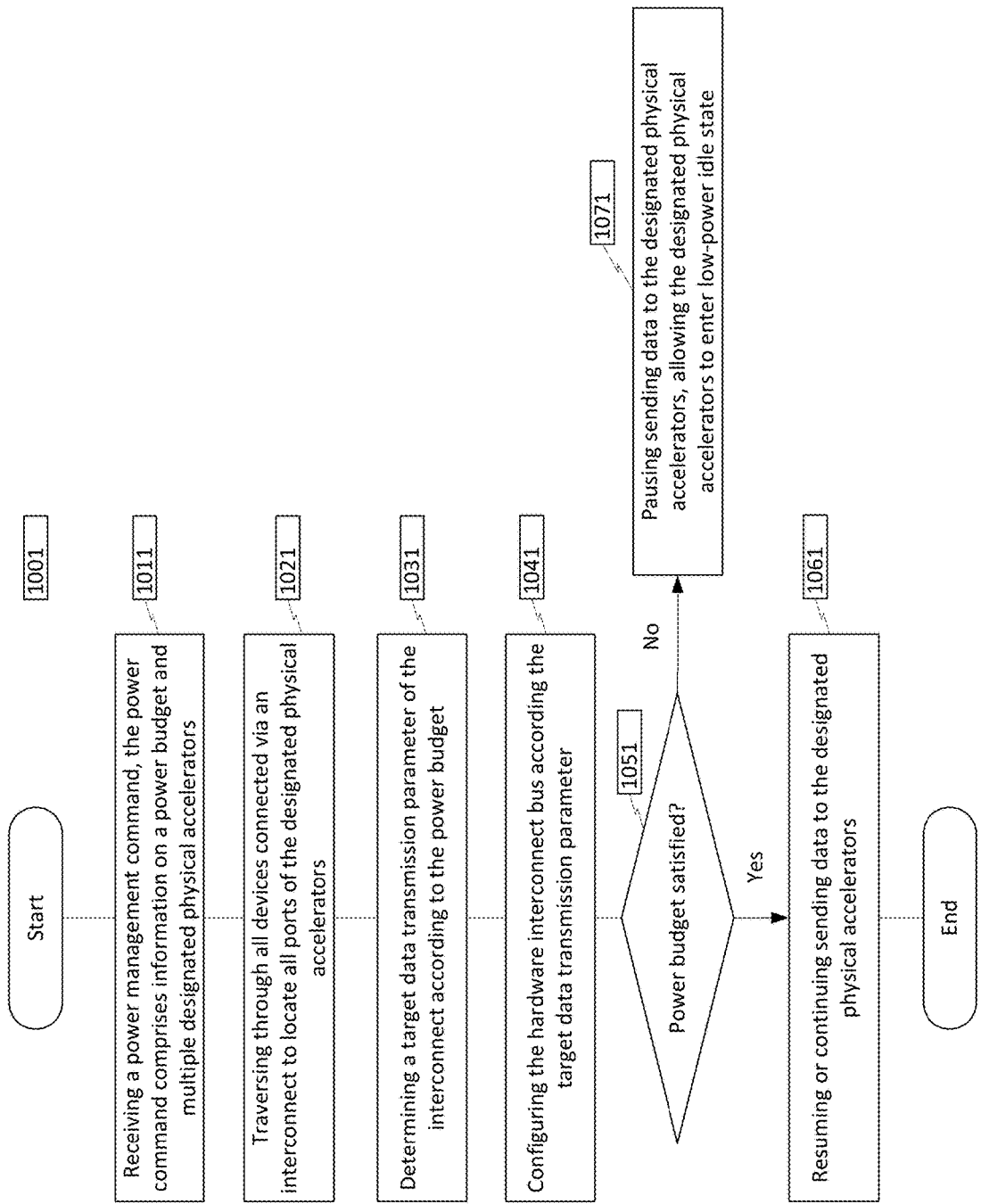
FIG. 6 is a flow diagram of an exemplary method for implementing power management of multiple physical accelerators with interconnect, according to some embodiments of the present disclosure.

In some embodiments, the power command from method 1000 comprises multiple designated physical accelerators. FIG. 6 is a flow diagram of an exemplary method for implementing power management of multiple physical accelerators with interconnect, according to some embodiments of the present disclosure. It is appreciated that method 1001 of FIG. 6 can be performed by an operating system in a virtualization environment (e.g., operating system 318 in virtualization environment 300 of FIG. 2 and FIG. 3).

In step 1011, the operating system receives a power management command. The power management command comprises a power budget and multiple designated physical accelerators. In some embodiments, the power budget is a predefined value for a data center (e.g., data center 120 of FIG. 1) that hosts the operating system. For example, as shown in FIG. 3, operating system 318 receives a power management command comprising a power budget and multiple designated physical accelerators. The power management command is associated with the data center that hosts operating system 318, and the designated physical accelerators are physical accelerators 304A and 304B. In some embodiments, the power budget can be set by a user of the operating system, or operating system itself. For example, as shown in FIG. 3, a user of operating system 318, or operating system 318 itself, can set the power budget.

In step 1021, the operating system traverses through all ports on the interconnect and locates ports that the designated physical accelerators are connected to. For example, as shown in FIG. 3, operating system 318 traverses all ports on interconnect 360 and finds ports that physical accelerator 304A and 304B are connected to.

In step 1031, the operating system determines one or more target data transmission parameters (e.g., data transmission rate, bandwidths, etc.) of the interconnect according to the power budget. In some embodiments, interconnect has bandwidth options of 32 GB/s, 16 GB/s, 8 GB/s, 4 GB/s, etc. For a received power budget, the operating system may determine one or more target bandwidths that matches any of the bandwidth options. For example, as shown in FIG. 3, interconnect 360 was operating at a bandwidth of 32 GB/s on the port that physical accelerator 304A is connected to, and a bandwidth of 16 GB/s on the port that physical accelerator 304B is connected to. After receiving a power budget, operating system 318 determines a new bandwidth of 16 GB/s for the port that physical accelerator 304A is connected to, and a bandwidth of 8 GB/s on the port that physical accelerator 304B is connected to.

In some embodiments, the operating system determines a single target data transmission parameter for all ports having a designated physical accelerator connection. For example, as shown in FIG. 3, interconnect 360 was operating at a bandwidth of 32 GB/s on the port that physical accelerator 304A is connected to, and a bandwidth of 16 GB/s on the port that physical accelerator 304B is connected to. After receiving a power budget, operating system 318 determines a new bandwidth of 8 GB/s for the ports that physical accelerators 304A and 304B are connected to.

In step 1041, the operating system configures the interconnect to operate at the target data transmission parameters. For example, as shown in FIG. 3, operating system 318 configures interconnect 360 to transmit data at a bandwidth of 16 GB/s for the port that physical accelerator 304A is connected to, and at a bandwidth of 8 GB/s for the port that physical accelerator 304B is connected to.

In step 1051, the operating system evaluates the total power consumption of the data center and decides whether the power budget was satisfied. If the power budget is satisfied, the operating system moves on to step 1060. If the power budget is still not satisfied, the operating system moves on to step 1070. For example, as shown in FIG. 3, after interconnect 360 has been configured, operating system 318 evaluates the total power consumption of the data center that hosts operating system 318 and decides whether the power consumption has satisfied the power budget.

In step 1061, having determined that the power budget is satisfied, the operating system continues or resumes sending data to the designated physical accelerators to keep the designated physical accelerators operating. For example, as shown in FIG. 3, having determined that the power budget is satisfied, operating system 318 continues to send data to physical accelerators 304A and 304B through interconnect 360, and physical accelerators 304A and 304B continues to operate.

In step 1071, having determined that the power budget is not satisfied, the operating system pauses sending data to the designated physical accelerators, allowing the designated physical accelerators to enter a low-power idle state. For example, as shown in FIG. 3, having determined that the power budget is not satisfied, operating system 318 pauses sending data to physical accelerators 304A and 304B, and physical accelerators 304A and 304B enter a low-power idle state.

In some embodiments, having determined that the power budget is not satisfied, the operating system pauses sending data to some of the designated physical accelerators, allowing those designated physical accelerators to enter a low-power idle state. For example, as shown in FIG. 3, having determined that the power budget is not satisfied, operating system 318 pauses sending data to physical accelerator 304A, and physical accelerator 304A enters a low-power idle state. Operating system 318 continues to send data to physical accelerator 304B through interconnect 360, and physical accelerator 304B continues to operate.

The various example embodiments described herein are described in the general context of method steps or processes, which may be implemented in one aspect by a computer program product, embodied in a computer-readable medium, including computer-executable instructions, such as program code, executed by computers in networked environments (e.g., data center 120 in computing environment 100 of FIG. 1). A computer-readable medium may include removeable and nonremovable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. The computer-readable medium can be a tangible and non-transitory computer readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the drawings and specification, there have been disclosed exemplary embodiments. Many variations and modifications, however, can be made to these embodiments. Accordingly, although specific terms are employed, they are used in a generic and descriptive sense only and not for purposes of limitation, the scope of the embodiments being defined by the following claims.

What is claimed is:

1. A method for power management, comprising:
   receiving a power management command, the power management command comprising a power budget and a designated accelerator;
   identifying, from a plurality of ports of an interconnect, a port associated with the designated accelerator;
   determining a target data transmission parameter for the designated accelerator according to the power budget; and
   controlling a data transmission parameter relative to the target data transmission parameter through the port associated with the designated accelerator.

2. The method of claim 1, wherein identifying, from the plurality of ports of an interconnect, the port associated with the designated accelerator further comprising traversing through the interconnect to locate a port connected to the designated accelerator.

3. The method of claim 1, wherein controlling the data transmission parameter relative to the target data transmission parameter through the port associated with the designated accelerator further comprising:
   determining whether the designated accelerator has exceeded the power budget; and
   pausing sending data to the designated accelerator through the interconnect in response to the determination that the power budget has been exceeded; or
   sending data to the designated accelerator through the interconnect in response to the determination that the power budget has not been exceeded.

4. The method of claim 1, wherein the power management command further comprising multiple designated accelerators.

5. The method of claim 4, further comprising determining different target data transmission parameters for different ports on the interconnect that are associated with the designated accelerators.

6. The method of claim 1, wherein the data comprising training weights in an algorithm of artificial neural network.

7. The method of claim 1, wherein controlling the data transmission parameter relative to the target data transmission parameter through the port associated with the designated accelerator further comprising configuring the interconnect to operate relative to the target data transmission parameter on the port.

8. The method of claim 1, wherein the interconnect comprises a peripheral component interconnect express (PCIe) bus or a mesh network.

9. A computer system, comprising:
an interconnect;
one or more accelerators;
one or more processors coupled to the one or one or more accelerators through the interconnect, the one or more processors configured to:
receive a power management command, the power management command comprising a power budget and a designated accelerator from one or more accelerators;
identify, from a plurality of ports of an interconnect, a port associated with the designated accelerator;
determine a target data transmission parameter for the designated accelerator according to the power budget; and
control a data transmission parameter relative to the target data transmission parameter through the port associated with the designated accelerator.

10. The computer system of claim 9, wherein the processor is further configured to traverse through the interconnect to locate a port connected to the designated accelerator.

11. The computer system of claim 9, wherein the processor is further configured to:
determine whether the designated accelerator has exceeded the power budget; and
pause sending data to the designated accelerator through the interconnect in response to the determination that the power budget has been exceeded; or
send data to the designated accelerator through the interconnect in response to the determination that the power budget has not been exceeded.

12. The computer system of claim 9, wherein the power management command further comprising multiple designated accelerators.

13. The computer system of claim 12, wherein the processor is further configured to determine different target data transmission parameters for different ports on the interconnect that are associated with the designated accelerators.

14. The computer system of claim 9, wherein the computer system is configured to be implemented in a cloud environment.

15. The computer system of claim 14, wherein the processor is configured to operate by following instructions from an operating system of a data center in the cloud environment.

16. The computer system of claim 15, wherein the operating system is Linux kernel and the operating system comprises a kernel-based virtual machine (KVM).

17. The computer system of claim 11, wherein the data comprising training weights in an algorithm of artificial neural network.

18. The computer system of claim 9, wherein the designated accelerator is one or more graphics processing units (GPUs).

19. The computer system of claim 9, wherein the processor is further configured to configure the interconnect to operate at a data transmission parameter relative to the target data transmission parameter on the port.

20. The computer system of claim 9, wherein the interconnect is a peripheral component interconnect express (PCIe) bus or a mesh network).

21. A non-transitory computer readable medium that stores a set of instructions that are executable by one or more processors of an apparatus to perform a method comprising:
receiving a power management command, the power management command comprising a power budget and a designated accelerator;
identifying, from a plurality of ports of an interconnect, a port associated with the designated accelerator;
determining a target data transmission parameter for the designated accelerator according to the power budget; and
controlling a data transmission parameter relative to the target data transmission parameter through the port associated with the designated accelerator.

22. The medium of claim 21, wherein the set of instructions that are executable by one or more processors of the apparatus to further perform traversing through the interconnect to locate a port connected to the designated accelerator.

23. The medium of claim 21, wherein the set of instructions that are executable by one or more processors of the apparatus to further perform:
determining whether the designated accelerator has exceeded the power budget; and
pausing sending data to the designated accelerator through the interconnect in response to the determination that the power budget has been exceeded; or
sending data to the designated accelerator through the interconnect in response to the determination that the power budget has not been exceeded.

24. The medium of claim 21, wherein the power management command further comprising multiple designated accelerators.

25. The medium of claim 24, wherein the set of instructions that are executable by one or more processors of the apparatus to further perform determining different target data transmission parameters for different ports on the interconnect that are associated with the designated accelerators.

26. The medium of claim 21, wherein the data comprising training weights in an algorithm of artificial neural network.

27. The medium of claim 21, wherein the set of instructions that are executable by one or more processors of the apparatus to further perform configuring the interconnect to operate at a data transmission parameter relative to the target data transmission parameter on the port.

28. The medium of claim 21, wherein the interconnect is a peripheral component interconnect express (PCIe) bus or a mesh network.

* * * * *